(No Model.)
C. LARDNER.
HAY FORK OR GRAPPLE.
No. 456,624.   Patented July 28, 1891.
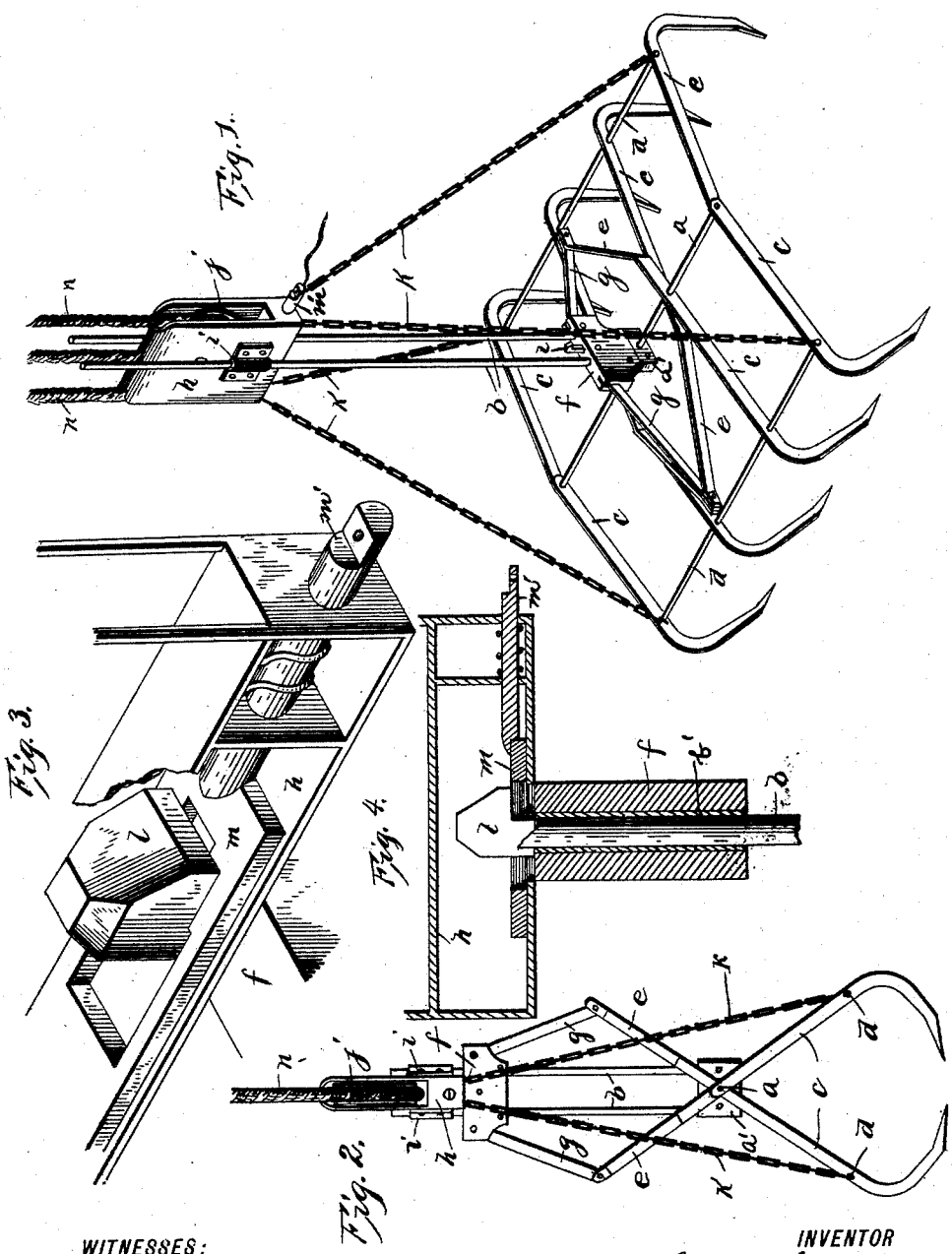
WITNESSES:
E. C. Duffy
H. E. Peak
INVENTOR
C. Lardner
BY O. E. Duff
ATTORNEY.

UNITED STATES PATENT OFFICE.

CHARLES LARDNER, OF TOPEKA, KANSAS.

HAY FORK OR GRAPPLE.

SPECIFICATION forming part of Letters Patent No. 456,624, dated July 28, 1891.

Application filed March 3, 1891. Serial No. 383,613. (No model.)

*To all whom it may concern:*

Be it known that I, CHARLES LARDNER, of Topeka, in the county of Shawnee and State of Kansas, have invented certain new and useful Improvements in Hay Forks or Grapples; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in forks or grapples, and more particularly to improvements in hay and straw forks.

The object of the invention is to provide an improved fork or grapple exceedingly strong, simple, and durable in construction and sure and effective in operation, which will automatically grasp and hold the load and elevate or convey it to any desired location and then drop or deposit the load at the desired spot. These objects are accomplished by and my invention consists in certain novel features of construction and in combinations of parts more fully described hereinafter, and particularly pointed out in the claims.

Figure 1 is a perspective view showing the fork open. Fig. 2 is a side elevation of the fork closed. Figs. 3 and 4 are sectional detail views of the supporting and closing and opening or operating blocks of the grapple.

In the drawings, the reference-letter $a$ indicates the main cross head or bar of the fork, from the central portion of which the two parallel vertical guide-rods $b\ b$ extend upwardly and are rigidly secured to and held a suitable distance apart by a block $a'$, carried by said cross-head $a$, as shown.

The fork proper consists of the two series of swinging fingers or hooks $c$, each hook at its upper end being mounted or journaled to swing upon said cross-head $a$, having its lower end preferably pointed and bent at a suitable angle, such as shown, to form a hook, so that the hooked or lower ends of the fingers will meet or almost meet, when the grapple is closed, as shown in Fig. 2. The fingers of each series are parallel, and when their outer ends are rigidly secured together operate in unison by the cross-rods or braces $d$. The upper ends of the two central fingers are extended upwardly or outwardly beyond the cross-head $a$, and the outer ends of each pair of fingers are rigidly secured together, as shown, to form operating-levers $e$, whereby the fork can be closed or opened. A fork operating or controlling block $f$ is confined and adapted to slide vertically on the two guide rods or bars $b$, said block having vertical sleeves $b'$ rigidly secured therein, which slide upon the guide-rods. Two pivoted links $g$ at their outer ends are pivoted, respectively, to the outer ends of the operating-levers $e$ of the grasping-fingers, and the opposite ends of said links are pivoted to the block $f$, so that when the block $f$ is at the lower ends of the rods $b$ the links $g$ and levers $e$ will swing and grasp the fingers open, as shown in Fig. 1; but when the said operating-block is drawn to the opposite ends of the rods $b$ it will close the fork through the medium of said links and levers, as shown in Fig. 2. This fork or finger operating block $f$ is raised and held suspended by means of the sliding supporting-block $h$, located between the guide-rods and provided with the sleeve $i$, through which said guide-rods pass. A pulley $j$ is mounted in the upper portion of this block $h$. Four chains $k$ at their upper ends are secured to said block $h$, and from thence extend, respectively, to the four corners of the fork, each chain at its lower end being secured to an outer grasping-finger between its pivotal point and its hooked end, these chains being preferably secured to the ends of rods $d$ and forming the main support for the fork proper over the block $h$.

A rigid arm or latch $l$, having a beveled and shouldered end, extends upwardly from the upper side of the fork-operating block $f$ between the two guide-rods $b$, and this latch is adapted to enter an aperture in the under side of block $h$ and engage and be locked by a sliding spring-bolt $m$, said bolt being of suitable construction and provided with an end $m'$, extending to the exterior of the block $h$, to which end a cord or other connection can be attached, whereby the bolt can be operated to release the latch $l$ at any time.

$n$ is the hoisting and operating rope, having one end rigidly secured to the block $h$, and from thence extending upwardly over a pulley carried by a suitable carrier, and from thence downwardly under pulley *j* and upwardly from another pulley on said carrier, and from thence to the operating means. This carrier can be stationarily arranged to travel upon a suitable support or track, so that a load can be automatically picked up and then conveyed to a suitable spot and dropped, the carrier forming no part of the present invention, which is confined entirely to the peculiar construction of fork or grapple.

Supposing the grapple to be grasping a load and in the position shown in Fig. 2 and located over the spot where the load is to be dropped, the operator, by means of the suitable connections, pulls the spring-bolt *m* out, so as to release the catch *l*. The block *f*, by reason of gravity, immediately drops upon the guides *b*, thereby opening the fork and dropping the load, chains or connections *k* supporting the grapple from block *h*, yet hindering in no way the opening or closing of the same. The grapple in the open position is then conveyed back to where the substance being transferred is located, and when over the same the supporting-rope is played out, so that the grapple is lowered in the open position upon the hay, straw, or the like, the block *h* dropping down on the guides *b* upon the block *f* and the latch *l* entering the opening in the lower end of the block *h* and being automatically locked by bolt *m*. Thus when the block *h* is drawn up by the supporting-rope it draws the block *f* up with it; hence drawing the fingers together and closing the grapple, and the fingers in going together pass down into and grasp the material to be conveyed and securely hold and retain the same without dropping or wasting until the grapple is opened to discharge. When the grapple is closed, as in Fig. 2, the chains or connections *k* still form the main support for the fingers and load. It is evident that the two rods *b b* form a guide for the two blocks *f* and *h*.

It is obvious that this invention can be applied to many uses and that very slight changes might be made in the form, arrangement, and constructions of the parts without departing from the spirit and scope of my invention. Hence I do not wish to limit myself to the precise construction shown.

What I claim is—

1. In a grapple or fork, the combination of two opposite similar series of hooked or bent grasping-fingers, a single cross-head upon which both series of fingers are mounted to swing, the guide-rods extending up from said cross-head, and blocks connected with said fingers and confined and slidable upon said rods for operating said fingers and supporting the fork.

2. In a fork or grapple, the two parallel guide-bars, a cross bar or head rigid with the lower ends thereof, two similar opposite series of grasping-fingers mounted to swing freely on said cross bar or head, and means, substantially as described, confined and slidable on said bars for operating said fingers.

3. In a fork or grapple, the combination of a vertical guide, a cross bar or head on the lower end of such guide, the two opposite groups of bent or hooked grappling-fingers mounted to freely swing on said cross bar or head, a sliding block on said guide connected with said fingers to open and close the same, and means, substantially as described, mounted on such guide and arranged for operating and controlling said block.

4. In a grapple, the combination of a vertical guide, the two opposite groups of freely-swinging grasping-fingers, one or more fingers of each group provided with the upwardly and outwardly extending operating arm or lever, the fingers of each group being secured to swing together, and a slidable block on said guide, links connecting said block and said extended ends or levers, whereby the fingers are opened and closed by the movement of said block, and means, substantially as described, for operating and controlling said block.

5. In a fork, the combination of the vertical guide, the cross-head secured to the lower end thereof, the two opposite groups of freely-swinging grasping-fingers mounted on said head, one or more fingers on each group having extended rigid ends or levers, the operating-block sliding freely on said guide and connected to said extended ends or levers by means of links, the slidable supporting-block also on said guide, flexible supports from said supporting-block to said groups of fingers, and means for locking said two blocks together, as and for the purposes set forth.

6. In combination, in a grapple or fork, the vertical guide-rods, the cross-head at the lower end thereof, the two freely-swinging groups of connected grasping-fingers, each group having an operating lever or arm, the sliding operating-block connected with said levers or arms, having an upwardly-extending latch, a slidable supporting-block, supporting connections or chains therefrom to said groups of fingers, the locking-bolt to receive said latch, and means for supporting and operating said supporting-block.

In testimony that I claim the foregoing as my own I affix my signature in presence of two witnesses.

CHARLES LARDNER.

Witnesses:
JOE FRISHMAN,
H. F. STEINBERG.